United States Patent [19]

Grove

[11] 4,273,214
[45] Jun. 16, 1981

[54] TRACK MOUNTED AERIAL LIFT PLATFORM APPARATUS

[75] Inventor: John L. Grove, Greencastle, Pa.

[73] Assignee: JLG Industries, Inc., McConnellsburg, Pa.

[21] Appl. No.: 772,812

[22] Filed: Feb. 28, 1977

[51] Int. Cl.³ .............................................. B66F 11/04
[52] U.S. Cl. ................................. 182/2; 182/13; 180/9.58
[58] Field of Search ............... 182/2, 12, 13; 267/58; 180/9.58, 9.6, 9.26; 280/124

[56] References Cited

U.S. PATENT DOCUMENTS

| | | | |
|---|---|---|---|
| 2,609,212 | 9/1952 | McMurtrie | 267/58 |
| 2,701,727 | 2/1955 | Linn | 267/58 |
| 3,199,620 | 8/1967 | Wheeler | 180/9.58 |
| 3,891,264 | 6/1975 | Hunter | 182/2 |

*Primary Examiner*—Reinaldo P. Machado
*Attorney, Agent, or Firm*—Irvin A. Lavine

[57] ABSTRACT

An aerial lift platform apparatus having tracks. A rotatable upper works is mounted on a chassis, and includes a turntable, a telescopic boom having a workman's platform at its outer end, and an engine driving a hydraulic pump. The chassis has forward and rear drive wheels on each side, and two pairs of intermediate idler wheels. Each pair of idler wheels is supported by a spring biased cranked axle which is journalled in bearings, to effect joint movement of the two wheels of the pair. All wheels have pneumatic tires and a track encompasses the tires on each side.

12 Claims, 7 Drawing Figures

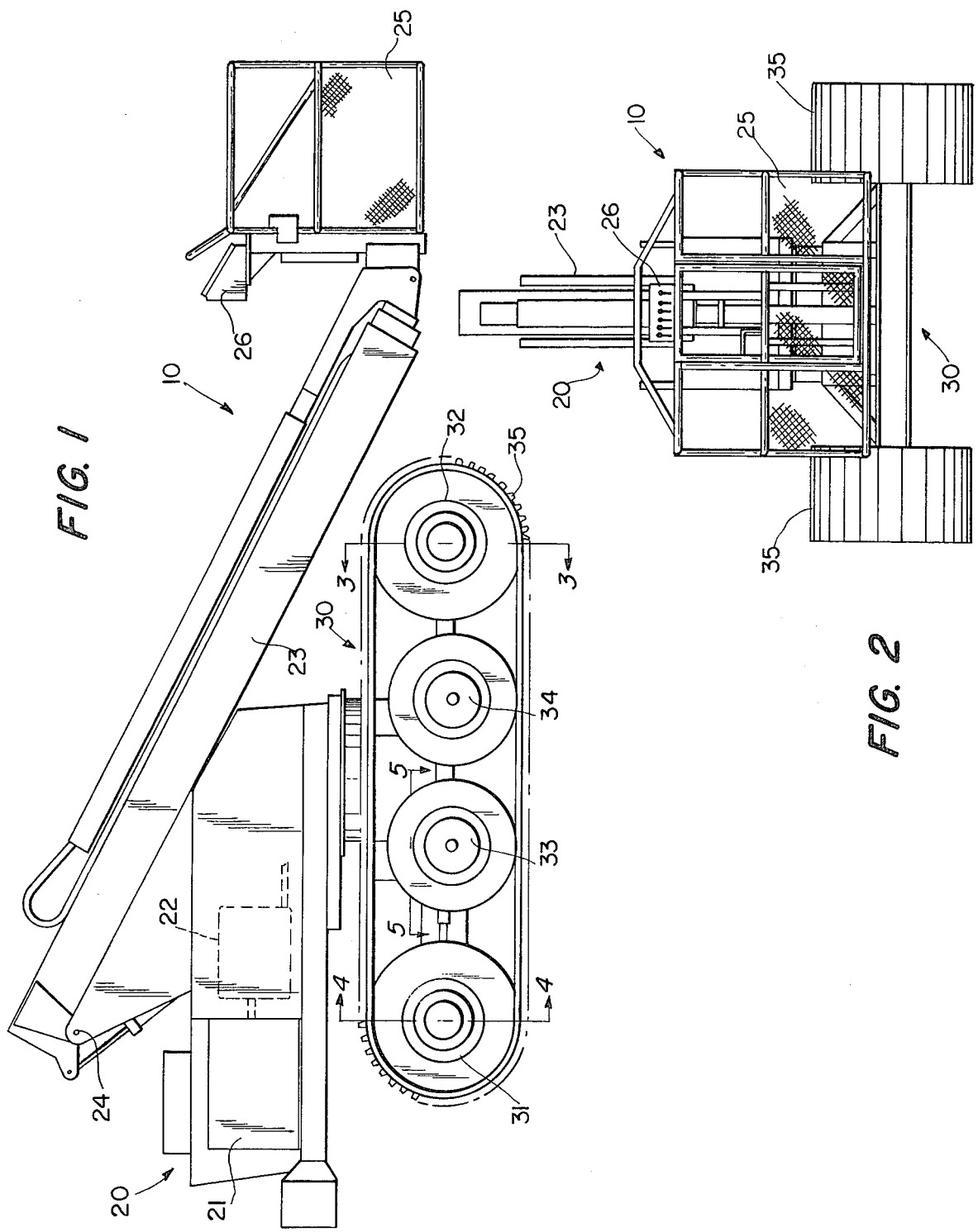

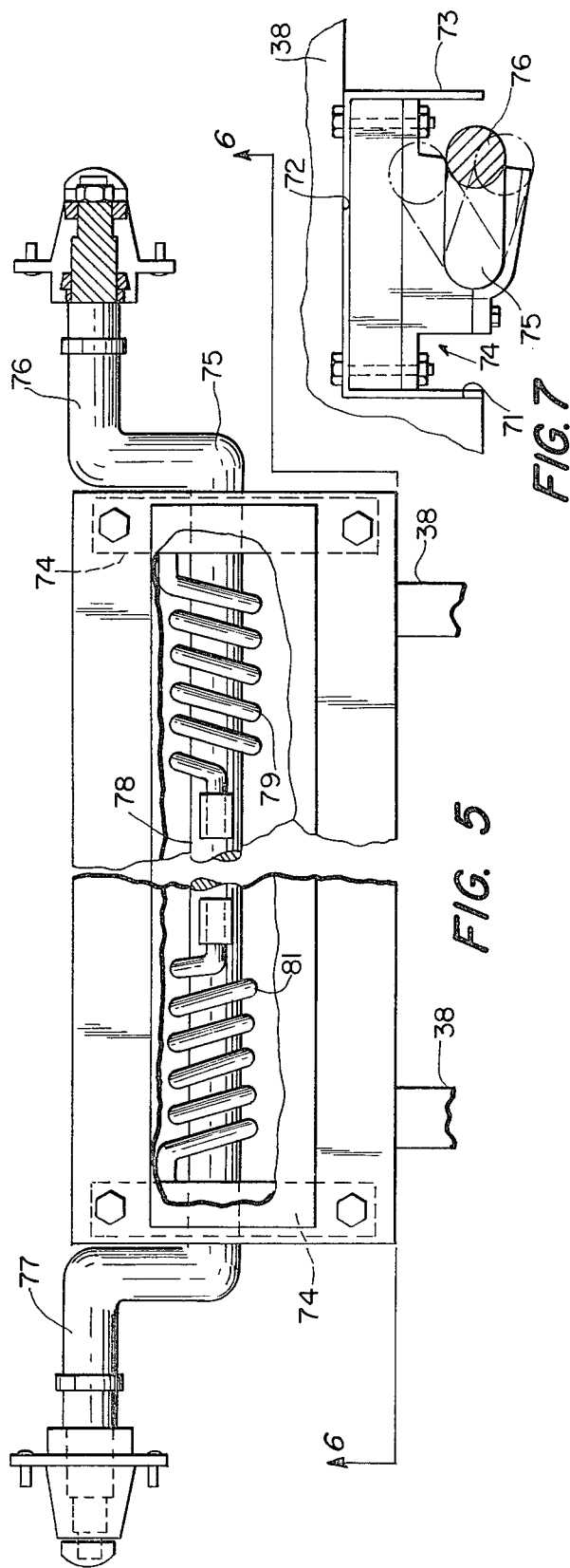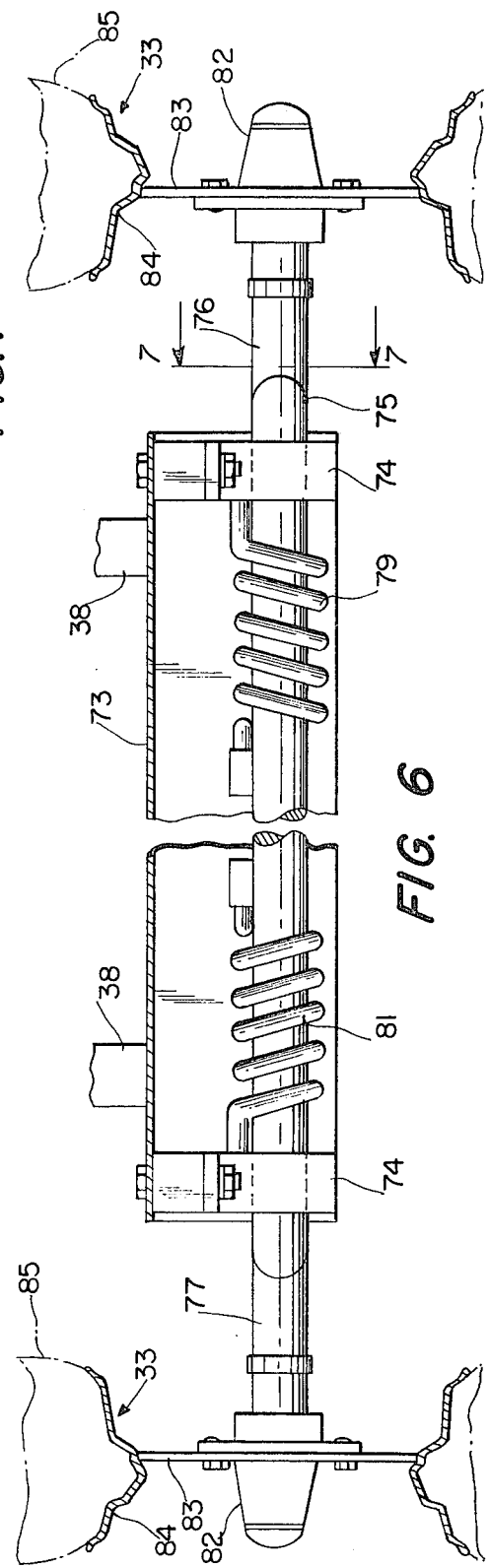

TRACK MOUNTED AERIAL LIFT PLATFORM APPARATUS

BACKGROUND OF THE INVENTION

The present invention relates to aerial lift platform apparatus, and more particularly to such apparatus which is mounted on a chassis having endless tracks or treads which engage the ground.

Aerial lift platform apparatus have been provided in the past, and their use has recently been significantly increasing. Such apparatus is in the form of a self-propelled vehicle having a chassis which is mounted on ground engaging wheels. Smaller units often have three wheels, while larger units, having a vertical reach of between approximately forty feet and one hundred and twenty-five feet, are mounted on four wheels. The chassis supports a rotatable upper works, which is capable of rotating through 360 degrees. A boom is carried by the upper works, having at or adjacent its outer end a workman's platform, usually provided with upstanding walls so as to form a basket-like structure, for purposes of safety. The boom is often extensible, and is caused to rotate through 360 degrees, due to its mounting on the upper works. In addition, the boom may be raised and lowered about a horizontal pivot. The upper works usually contains a prime mover, such as an internal combustion engine, which drives one or more pumps, to thereby deliver power to rotary motors positioned at one or more of the wheels in order to propel the vehicle, and also to deliver hydraulic fluid under pressure to various cylinders, such as for steering and boom extension and retraction. Rotation of the upper works is also effected by a hydraulic motor driven by the pump. All controls are provided in duplicate, so that there is a set of controls accessible to a person standing by the machine, and also a set of controls is provided at the platform, so as to be accessible to the operator or workman in the platform.

An aerial lift platform has been provided, mounted on a tracked vehicle chassis, instead of wheels. There was thereby gained the advantage of permitting operation where the supporting surface was relatively soft, and could not sustain a vehicle of such weight when mounted on wheels. This construction was a known crawler type construction which provided a steel driving sprocket and a steel idler at the ends, and intermediate steel rollers which were rigidly mounted to the chassis. This construction, while suitable for use in terrain of a relatively soft nature, provided no shock absorbing or cushioning for the operator, who could only drive the vehicle from the the operator's platform.

In another embodiment, an aerial lift platform was provided which was mounted on tracks, and was provided with a cab on the vehicle, which cab had controls for moving the vehicle. The operator's platform was not provided with controls for moving the vehicle, so that the operator, when the vehicle was moving, could only be in the cab which was mounted directly on the vehicle. Once the aerial lift platform was set in position, an operator occupied the platform, and by manipulation of the controls in the platform on the boom, was able to rotate the upper works, raise and lower the boom and extend and retract the boom, but could not, as noted, cause the vehicle to move. In this construction, pneumatic tires were provided, for both drive and intermediate or idler wheels, and the idler wheels were mounted on independent spring loaded axles. That is, one or more of the idlers on one side of the chassis could be moved upwardly, or downwardly, relative to a reference point on the chassis, without causing movement of any idler on the opposite side, relative to the same or a corresponding reference point on the chassis.

The aerial lift platform apparatus having rigid suspension also had a cab on the chassis, and thus required two operator's stations, one at the cab and one at the platform, and there was thereby required, extra cost; in addition there was the problem that the vehicle could not be moved by the operator in the cab and thus was more expensive from the point of view of personnel cost, and was somewhat less efficient. On the other hand, where the shock absorbing or cushioning type suspension was utilized, including pneumatic tires and spring loaded intermediate wheels, stability was not as great as desired, particularly when the boom was extended over one side. It has been found that with the boom extended over one side, there is produced an over-turning moment tending to tilt the machine and overturn it to the side over which the boom extends. The problem is known to be more severe where there is a shock absorbing or cushioning or so-called "sprung" chassis, and this has been solved in the past, for instance in connection with truck mounted cranes, by the use of outriggers. Thus, the truck mounted cranes have the outriggers in stored, non-use position during movement of the truck mounted cranes from one place to another, but when relatively heavy loads are to be lifted, the outriggers are utilized, and their positioning in effect renders the spring mounting of the chassis on the ground engaging wheels inoperative. That is, during the lifting of loads near the capacity of the truck mounted crane, the spring suspension of the chassis is made inoperative and the supporting of the chassis is by the outriggers, which bypass the spring suspension of the chassis. Of course, with such cranes, it is not possible to move them when the outriggers are positioned.

There are known, also, mobile cranes which are intended to lift and move a load by movement of the entire truck mounted crane. In such units, however, although outriggers are not used, movement of the entire truck mounted crane is effected with the load and the boom centered, and not extending over the side.

Various vehicles are known which utilize tracks, and have pneumatic tires, together with spring-loaded independently movable intermediate or idler wheels. In these constructions, however, there is no boom, and therefore no overturning moment resulting from a boom positioned over the side.

SUMMARY OF THE INVENTION

The present invention provides an aerial lift platform apparatus which is track mounted, which has a cushioned ride for the operator in the operator's platform, and which has improved stability against overturning, without the use of outriggers. The aerial lift platform apparatus comprises a chassis and a rotatable upper works mounted on the chassis for rotation through 360 degrees. The upper works includes an engine and a pump, to provide a source of hydraulic pressure for various hydraulic operated components. A boom, preferably an extensible boom, is mounted on the upper works, preferably by a pivot so as to permit rotation of the boom in a vertical plane. An operator's platform is carried adjacent the outer end of the boom, and is provided with controls for effecting movement of the entire apparatus, for rotating the upper works, for luffing the boom and for extending and retracting the boom. The chassis has, on each side, front and rear wheels, and at least one intermediate wheel. The wheels are all pneumatic tires, to provide shock absorbing characteristics, and a track encompasses these tires. The idlers are resiliently biased by springs, and are connected for conjoint movement. This provides for increased stability, particularly when the boom is over the side, while at the same time providing a cushioning ride for the operator in the operator's platform, which is necessarily located at a remote distance from the center of the vehicle, and is thereby subject to substantial oscillatory movement as the vehicle is moved. The positioning of the boom over one side causes some tilting of the vehicle to that side, due in part to the added load on the pneumatic tires, which tend to deform. This in effect raises the idler on the loaded side of the vehicle relative to a reference point on the chassis, and the resulting conjoint movement of the idler on the opposite side tends to raise that idler from engagement with the track, and counteract the overturning movement which would be generated due to the spring which resiliently urges the opposide-side idler into engagement with the track.

BRIEF DESCRIPTION OF THE DRAWINGS

FIG. 1 is a side elevational view of an aerial lift platform apparatus in accordance with the present invention.

FIG. 2 is a front elevational view of the aerial lift platform apparatus as shown in FIG. 1.

FIG. 5 is a cross sectional view taken on the line 5—5 of FIG. 1, with parts removed.

FIG. 6 is a view taken on the line 6—6 of FIG. 5, and with parts restored.

FIG. 7 is a cross sectional view taken on the line 7—7 of FIG. 6.

DESCRIPTION OF THE PREFERRED EMBODIMENT

Figure 3:
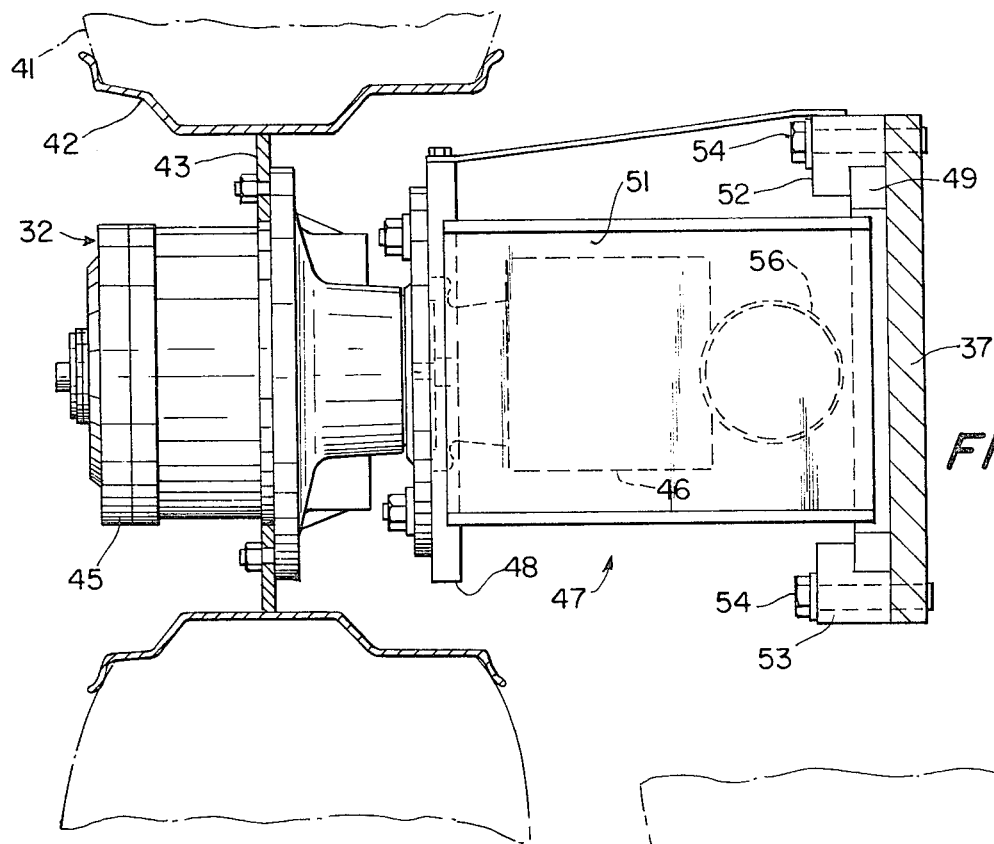
FIG. 3 is a cross sectional view taken on the line 3—3 of FIG. 1.

Referring now to the drawings, wherein like or corresponding reference numerals are used to designate like or corresponding parts throughout the several views, there is shown in FIG. 1 an aerial lift platform apparatus 10 in accordance with the present invention. The apparatus 10 includes an upper works 20 which is rotatable on a vertical axis, and which includes an engine in an engine compartment 21, the engine driving a pump 22 for supplying fluid under pressure to various hydraulically operated elements. An extensible boom 23 is provided, supported on a horizontal pivot 24 for luffing movement. The boom 23 carries an operator's platform 25, having a control console 26 thereon, so as to enable the operator to drive and steer the apparatus 10, and also to cause rotation of the upper works 20, extension and retraction of the boom 23 and luffing of the boom 23 about the pivot 24.

The upper works 20 is mounted on a chassis 30, which includes a structural chassis frome, and a suspension system. The suspension system includes end wheels 31 and 32 and intermediate wheels 33 and 34. All of the wheels include pneumatic tires, and a track 35 is in engagement with all of the wheels.

Referring to FIG. 2, there may be seen the two tracks 35, one on either side of the apparatus 10, together with the boom 23 and operator's platform 25. There is also shown the control console 26.

In order to drive and steer the aerial lift platform apparatus 10, an operator positions himself in the platform 25, and operates the controls at the control console 26. In FIG. 1, the platform 25 is as close as possible to the center of the chassis 30. When the aerial lift platform apparatus 10 is driven, therefore, even on a relatively smooth surface, there will be vibrations transmitted to the operator, and these will be amplified, due to the distance of the operator from the chassis 30. Where the aerial lift platform apparatus is driven over an uneven base, there will be imparted to the chassis 30 a pitching movement, that is, a rotation about a generally horizontal axis extending transversely through the chassis. Since the entire apparatus 10 will thereby pitch or rotate about that axis, the platform 25 will also rotate about that axis, and as a result the unevenness of the terrain is amplified by the distance of the platform 25 from the pitching axis. In order to diminish discomfort to an operator in the platform 25, which is the only operational station on the apparatus 10, the aforementioned pneumatic tire suspension system is utilized, together with resilient mounting of the intermediate wheels 33 and 34.

Referring now to FIG. 3, there may be seen the wheel 32, including the pneumatic tire 41 mounted on a rim 42 having a disk 43. Disk 43 is bolted to a torque hub 45 of known construction, torque hub 45 being connected to a rotary motor 46 which is supplied with fluid from the pump 22. The motor 46 drives planetary gearing (not shown) within the torque hub 45, to drive it. The wheel 32, including tire 41, torque hub 45 and motor 46, is supported on a mount, generally designated 47. The mount 47 includes the hub mount plate 48, to which a flange of the torque hub 45 is bolted, and also includes, in spaced relation to it, a slide plate 49. Channel 51 is secured to hub mount plate 48 and slide plate 49, as by welding, and a second channel (not shown) is positioned opposite the channel 51, so that the channels provide a space between them for the motor 46. A planar structural chassis plate 37 is shown, being located in a vertical plane, and comprising a portion of the chassis 30. An L-shaped upper rail 52 and a lower L-shaped rail 53 are provided, secured to the chassis plate 37 by screws 54 which extend through the rails 52 and 53 and which are threaded into threaded openings in the plate 37. The screws 54 may be loosened to permit the slide plate 49 and thereby the wheel 32 to move horizontally, and then the screws 54 may be tightened so as to clamp the slide plate 49 against the chassis plate 37, to secure it in a fixed position. Movement may be effected by a suitable hydraulic motor, designated 56, and acting between the channel opposite channel 51 and an anchor (not shown) fixed to the chassis plate 37. This provides for effecting adjustment of the tension of the track 35 by in effect moving the wheel 32 away from the wheel 31.

Figure 4:
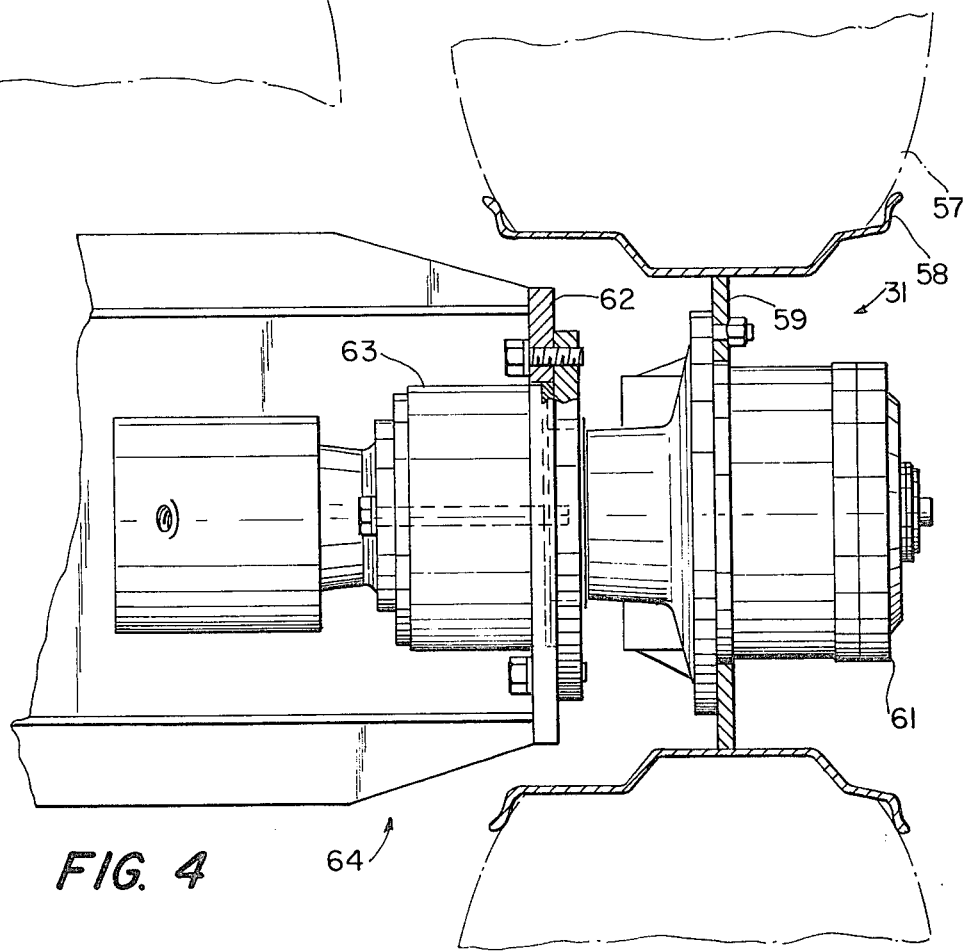
FIG. 4 is a cross sectional view taken on the line 4—4 of FIG. 1.

In FIG. 4 there is shown the assembly of the wheel 31 to the chassis 30, there being indicated a pneumatic tire 57 mounted on a rim 58, the rim having a disk 59 mounted to a torque hub 61. The torque hub is supported on a hub mount plate 62, and a rotary motor 63, supplied from the pump 62, is secured to the torque hub 61 to effect driving of it. The hub mount plate 62 forms a part of a mount structure 64 which is connected to the chassis, as to a plate similar to the chassis plate 37 shown in FIG. 3.

FIGS. 5, 6 and 7 disclose the mounting and suspension of idler wheel 33, and the corresponding idler wheel on the opposite side of the vehicle from that shown in FIG. 1, so that the idlers are arranged in pairs, one on either side of the chassis, for conjoint movement.

Referring first to FIG. 7, there may be seen a portion of a structural plate 38 forming part of the chassis. Plate 38 is shown broken away, and is provided with a first vertical edge 71, and a horizontal edge 72. A downwardly facing channel 73 is provided, secured to the plate 38, as by welding. The channel 73 has secured to it a bearing generally designated 74, which supports the axle 75. As shown in FIG. 5, the axle 75 has offset ends 76 and 77, and is known as a cranked axle. Thus, the axle 75 is continuous from the cranked end 76, through the central portion 78, and to the cranked end 77. A coil spring 79 encircles the central portion 78 of axle 75, having one end connected to central portion 78 and the other end connected to the bearing 74. A similar coil spring 81 is also mounted on the central portion 78 of the axle 75, and is connected to the central portion 78, and to the opposite bearing 74.

FIG. 6 discloses the channel 73 mounted in the chassis plate 38, and it will be observed that there are symmetrical chassis plates for the two sides of the chassis. There are shown the two bearings 74, one at either side of the chassis and the two coil springs 79 and 81, each connected to the axle 75 and to the adjacent bearing 74. There may also be seen hubs 82 which are journalled on the ends 76 and 77 of the continuous, cranked, axle 75, and which have joined to them disks 83 that support rims 84 on which the pneumatic idler tires 85are mounted. As will be understood, the disks 83, rim 84 and tire 85 provide the elements of the wheel 33. The construction of the axle 75 provides for the above noted conjoint movement of the two idler wheels 33, which form a pair on opposite sides of the vehicle. Consequently, should the wheel 33 shown in FIG. 1 be caused to move upwardly relative to a reference point on chassis 30, the opposite wheel 33, forming the other one of the pair, will also be constrained to move upwardly, for conjoint movement. It will also be understood, of course, that the springs 79 and 81 provide resilient support of a portion of the weight of the chassis on the idlers 33.

In operation, a workman positions himself in the platform 25, and drives the aerial lift platform apparatus 10, by driving and steering, to the desired position. During this driving movement of the aerial lift platform apparatus 10, the pneumatic tires forming part of the wheels 31, 32, 33 34 provide a cushioning effect, so as to diminish movement of the platform 25 which is carried at or near the end of boom 23. In addition, some resilient support and shock absorption is provided, by the springs which encircle the cranked axles of the idlers 33 and 34. Thereby, a shock absorbing, cushioned ride is provided for the operator in the platform 25.

Once the aerial lift platform apparatus 10 is in position, the upper works 20 is rotated, and the boom 23 may, for example, be moved through approximately 90°, so that the boom 23 extends over one side. The boom 23 may then be elevated and extended, and thus there is applied an overturning moment to the aerial lift platform apparatus 10. Due to the positioning of the weight of a substantial portion of the boom 23, the platform 25 and the workman therein at a substantial distance outwardly of the boundaries of the chassis 30, there will result a relatively greater amount of weight applied to the track 35 and wheels 31–34 of the side of the chassis 30 over which the boom 23 extends. This will cause added weight on the tires of each of the wheels 31–34, and these tires will thereby be somewhat flattened. The tires on the opposite side to that over which the boom 23 extends will bear less weight, and will not thereby be subject to a flattening force that is in addition to the normal force, as when the upper works 20 is in the position shown in FIGS. 1 and 2. The flattening of the tires on the more heavily loaded side will result in a tilting of the structural frame of the chassis 30. Thus, there will be an overturning movement imposed by the weight and position of the boom 23 and platform 25. Stability is enhanced, however, because the spring on each of the idler axles will not be permitted to add to the overturning moment. The springs normally tend to raise the structural chassis relative to the ground, and in order to do this, apply a force to the axle and through it, to the wheels and to the ground, acting through the tread 35. In the present construction, the idler wheel which is less loaded, because it is on the side opposite that over which the boom extends, is raised relative to a reference point on the structural frame of chassis 30, so that the spring on the axle which is adjacent the opposite-side idler wheel does not push the opposite-side idler wheel against the track 35 and the ground and therefore prevents the application of a force which would add to the overturning moment created by the weight and position of boom 23 and platform 25.

Instead, when there is a load on one side of the chassis 30, due to the over the side positioning of the boom 23, the flattening of the pneumatic tire tends to move upwardly the cranked end of axle 25: for example, assuming that the boom is extending over the side adjacent the cranked end portion 26 as shown in FIGS. 5–7, there would be a tendency for the cranked end portion 76 to move in a counter-clockwise direction as seen in FIG. 7, and to thereby rotate the entire axle 75 in the counter-clockwise direction. This would similarly raise the cranked end portion 77, which is on the side opposite to the more heavily loaded side, and there would not be a spring force, as from spring 81, which would tend to urge the wheel 33 carried by the cranked end portion 77 against the track and ground on the opposite side. Thus, stability during over the side operation is achieved, with a construction providing a cushioned ride so as to dampen oscillatory movements caused to the operator in platform 25 when the aerial lift platform apparatus 10 moves over uneven terrain.

It will be obvious to those skilled in the art that various changes may be made without departing from the spirit of the invention, and therefore the invention is not limited to what is shown in the drawings and described in the specification but only as indicated in the appended claims.

I claim:

1. Aerial lift platform apparatus comprising a chassis and a rotatable upper works mounted thereon,
   said upper works comprising a boom,
   said boom having an operator's platform adjacent the outer end thereof,
   said chassis comprising on each side first and second end wheels and at least one intermediate wheel, at least one end wheel being a driving wheel, means mounting said end wheels on said chassis, said wheels each including a pneumatic tire, a track on said wheels, means for mounting the intermediate wheels on opposite sides of the chassis as a pair for conjoint movement when the chassis is tilted to one side or the other, and resilient means biasing said intermediate wheels away from said chassis, whereby to lessen the overturning moment occurring when the boom extends over one side of the apparatus.

2. The aerial lift platform apparatus of claim 1, wherein said intermediate wheel mounting means comprises a transverse member extending between and connected to said pair of intermediate wheels.

3. The aerial lift platform apparatus of claim 1, wherein said intermediate wheel actuating means comprises a transverse axle having cranked ends, the intermediate wheels mounted on the cranked ends, and means on said chassis journalling said axle.

4. The aerial lift platform apparatus of claim 1, said resilient biasing means comprising coil spring means encircling said axle and connected to said axle and said chassis.

5. The aerial lift platform apparatus of claim 1, said resilient biasing means comprising first and second coil springs encircling said axle, each having one end attached to the axle and the other end connected to said chassis.

6. The aerial lift platform apparatus of claim 1, wherein said end wheels mounting means comprises means for fixedly mounting said end wheels on said chassis.

7. The aerial lift platform apparatus of claim 7, and means for driving two end wheels on each side of said apparatus.

8. An aerial lift platform apparatus wherein a self propelled chassis rotatably supports an upper works having a boom extending from it and an operator's platform carried by the boom adjacent the free end thereof, the improvement comprising wheels on each side of the chassis having pneumatic tires and tracks encircling the tires, there being at least three wheels on each side including two fixed end wheels and an intermediate wheel, and mounting means for the intermediate wheels comprising means for resiliently biasing said intermediate wheels and means for moving upwardly an intermediate wheel on one side relative to the track on that side when the chassis is tilted so as to raise the said one side thereof.

9. The aerial lift platform apparatus of claim 8 said mounting means comprising an axle extending transversely of said chassis, means journalling said axle to said chassis, said axle having cranked ends, and a said intermediate wheel journalled on each of said cranked ends.

10. The aerial lift platform apparatus of claim 9, and means for resiliently biasing said axle against rotation.

11. The aerial lift platform apparatus of claim 10, said resilient biasing means comprising coil spring means.

12. The aerial lift platform apparatus of claim 10, said resilient biasing means comprising coil spring means encircling said axle and connected to said axle and to said chassis.

* * * * *